Oct. 12, 1971  F. R. SHORT  3,611,725
LIFT-CRUISE JET ENGINE
Filed April 17, 1969
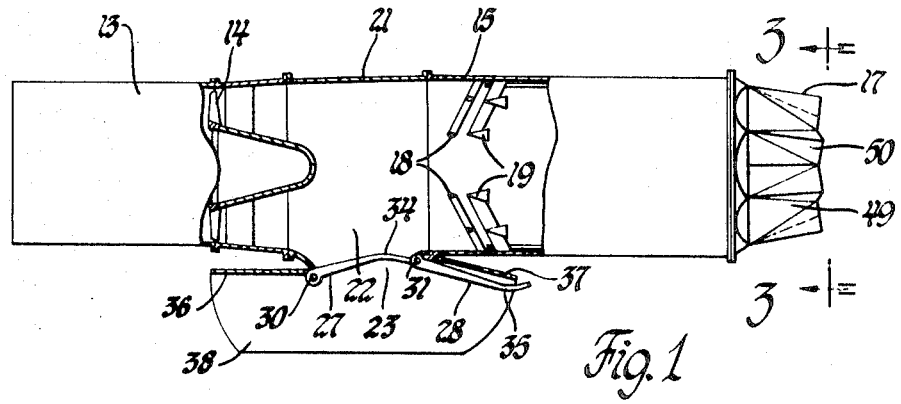
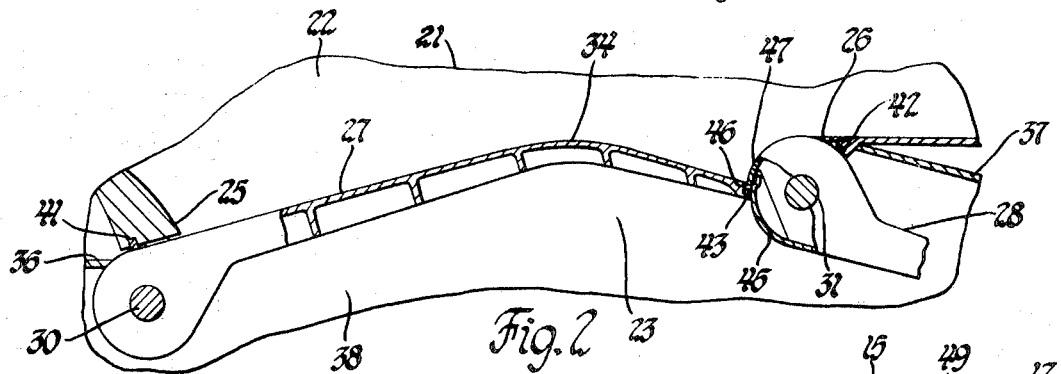
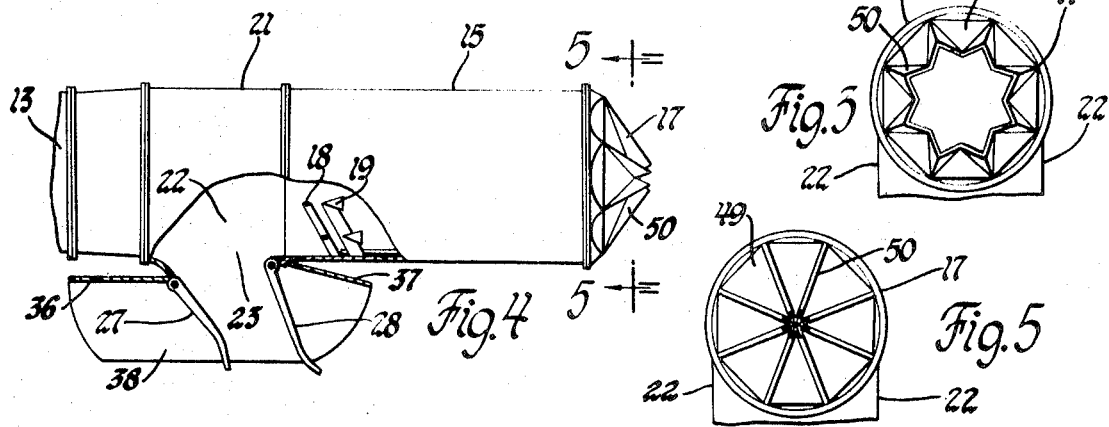
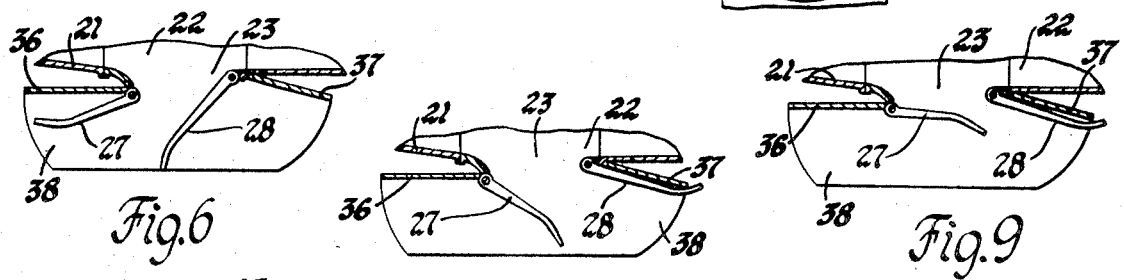
INVENTOR
Frederick R. Short
BY
Paul Fitzpatrick
ATTORNEY United States Patent Office 3,611,725
Patented Oct. 12, 1971

3,611,725
LIFT-CRUISE JET ENGINE
Frederick R. Short, Indianapolis, Ind., assignor to
General Motors Corporation, Detroit, Mich.
Filed Apr. 17, 1969, Ser. No. 817,625
Int. Cl. F02k 1/00
U.S. Cl. 60—229
1 Claim

ABSTRACT OF THE DISCLOSURE

A jet engine for both direct lift and forward propulsion of an aircraft has a gas generator discharging into an exhaust duct which has a rearwardly directed variable area nozzle and a downwardly directed variable lift nozzle. The propulsion nozzle is of a type which can be substantially entirely closed. The lift nozzle includes movable vanes at its forward and rear edges which may be swung to vary the direction of thrust from partly forward to rearward and in which the forward vane may be swung rearwardly to throttle the outlet, and finally into contact with the rear vane to close the lift nozzle entirely. In transition between lift and cruise conditions, the areas of the two nozzles are varied inversely so as to maintain substantially constant turbine speed and back pressure and substantially constant total thrust.

The invention herein described was made in the course of work under a contract or subcontract thereunder with the Department of Defense.

DESCRIPTION

My invention relates to jet engines of the sort which are used both as direct lift devices to lift an aircraft from the ground and as jet propulsion devices for normal forward movement of an aircraft, or what may be termed cruise conditions.

There have been many proposals to provide aircraft with jet engines for propulsion and for lift. In some cases, distinct engines are used for the two purposes. Other proposals include arrangements to tilt the engines from a vertical position for lift to a horizontal position for cruise; to provide various types of vectoring exhaust systems on an engine with constant attitude in the aircraft so that the jet may be directed either downwardly or rearwardly; and to provide a single engine with both a lift nozzle and a propulsion or cruise nozzle plus a valve to direct gas flow to one or the other. All of these have drawbacks of one sort or another.

I propose to provide a gas generator with two nozzles, one for normal cruise and one for lift, and in which both nozzles are capable of being completely or almost completely closed so that a valve to divert flow to one or the other nozzle is unnecessary and is omitted. This has very beneficial results. Perhaps the nearest thing to it is the arrangement of two nozzles with a valve to direct the flow to one or the other. However, in that sort of installation, assuming that maximum thrust is the same in either the lift or cruise condition, there is a great falling off of total thrust during transition between these two conditions, which I have calculated to reach about a forty percent loss in total thrust. In making a transition from lift to forward propulsion, there is very substantial loss in the lift thrust before any substantial forward thrust is provided. Thus, for the airplane to make the transition, there must be a very substantial excess lift capability present.

In an engine according to my invention, as the transition from lift to cruise is made, the exhaust from the lift nozzle is deflected rearwardly to provide a substantial forward component of thrust without any loss in vertical thrust except such as results from the cosine function involved in deriving the vertical thrust component from thrust at an angle to the vertical. As the horizontal component of thrust from the lift nozzle accelerates the airplane, the cruise nozzle may be opened gradually to provide more forward thrust and then, as the lift nozzle is further closed and further vectors the lift jet toward the horizontal, the cruise nozzle takes more and more of the flow and exerts a greater proportion of the thrust. Finally, the lift nozzle is completely closed and the cruise nozzle, which is more efficient for propulsion, takes the entire output of the engine. In the reverse transition, the cruise nozzle may be gradually shut down as lift is transferred to the lift nozzle which may be swung so as to exert a rearward component of thrust to decelerate the aircraft to a hovering condition.

The principal object of my invention is to provide an efficient vectoring jet lift and jet thrust engine particularly suited to the requirements of modern aircraft.

The nature of my invention and the advantages thereof will be clearly apparent to those skilled in the art from the succeeding detailed description and drawings of the preferred embodiment of the invention. It is to be understood that the described embodiment is illustrative and the description thereof is not intended to be restrictive, since modifications may be made by the exercise of skill in the art.

Referring to the drawings, FIG. 1 is a somewhat schematic elevation view of a lift-cruise turbojet engine with parts cut away and in section, showing the cruise nozzle open and the lift nozzle closed.

FIG. 2 is a greatly enlarged fragmentary view illustrating the lift nozzle in closed position.

FIG. 3 is a view of the star-type cruise nozzle in open position.

FIG. 4 is a view corresponding to a portion of FIG. 1 illustrating the cruise nozzle in closed position and the lift nozzle in intermediate forward thrust position.

FIG. 5 is a view of the cruise nozzle in closed condition.

FIGS. 6 through 9 are views illustrating various conditions of operation of the lift nozzle, FIG. 6 showing the position for maximum reverse thrust.

FIG. 7 illustrates the position for intermediate reverse thrust.

FIG. 8 illustrates the position for maximum forward thrust.

FIG. 9 illustrates the lift nozzle with reduced throat area during transition between lift and cruise modes.

Referring first to FIG. 1, there is illustrated an aircraft engine of a turbojet type comprising a gas generator 13 preferably of a gas turbine type as illustrated including a compressor and combustion apparatus (not illustrated) and a turbine 14 discharging into a duct 15 for hot pressurized exhaust gas. The engine ordinarily is of circular cross section with an exhaust which is substantially horizontal in the normal flight attitude of the aircraft.

The gas duct 15 terminates in a variable jet propulsion or cruise nozzle 17 of any suitable type. As illustrated, the engine includes an afterburner in the terminal part of duct 15 which includes spray bars 18 and flameholders 19. The afterburner is optional so far as my invention is concerned. The nozzle 17 is of a convergent type and in its full open position illustrated in FIG. 3 has a much smaller area than the gas duct 15 so that the propulsive jet is accelerated through the nozzle into the ambient atmosphere.

Gas duct 15 includes an inner forward portion 21, the lower half of which has parallel vertical side walls 22 (see also FIGS. 3 and 5) leading to a rectangular outlet or nozzle at 23 defined between the walls 22 and the forward edge 25 and rear edge 26 of an opening in the bottom of the duct section 21.

The lift nozzle includes means for vectoring or controlling the lift jet, the primary parts of which are a front vane 27 and a rear vane 28 pivoted for swinging movement respectively about shafts defining an axis at 30 for the front vane and an axis at 31 for the rear vane, these axes being parallel and extending transversely of the engine. Vanes 27 and 28 may be moved between their extreme rearward position illustrated in FIGS. 1 and 2 and their extreme forward position illustrated in FIG. 6. The vanes are substantially flat but have a curvature as indicated at 34 and 35 to promote smooth flow and to assist in defining the throat of the nozzle in various conditions of operation, particularly when the vanes are centered to direct the jet vertically downward. The vanes 27 and 28 are metal panels which may be reinforced by ribs as illustrated.

Preferably the vanes are fixed to shafts 30 and 31 which extend outside the nozzle and are coupled to any suitable power actuator (not illustrated) generally as shown in U.S. Pat. No. 3,394,907 of Castle et al. July 30, 1968 and in U.S. Pat. No. 3,442,455 of Smale, May 6, 1969. The structure of the lift nozzle also includes top plates 36 and 37 which extend forwardly and rearwardly respectively from the nozzle opening 23 and a side plate 38 at each side which lies against the lateral edges of the vanes 27 and 28 throughout their range of movement as will be apparent from the several views such as FIGS. 4, 6, 7, 8, and 9. A seal strip 41 is provided between the edge 25 of the nozzle and the rounded pivot end of vane 27; likewise a seal strip 42 between the rear edge of the nozzle and the rounded pivot end of vane 28. A seal strip 43 mounted in the free edge of vane 27 is in position to engage the slightly flexible sheet metal surface 45 of vane 28 to close the nozzle completely when the parts are in the position illustrated in FIGS. 1 and 2. An offset in the end of vane 28 defines a shoulder 46 against which the vane 27 bears in closed position. The portion 45 of vane 28 may yield slightly to accommodate itself to the seal strip 43. Pressure within the duct 15 is communicated to the inner surface of the portion 45 through a small hole 47 in vane 28. The side plates 38 may be reinforced in any suitable way or they may be tied to the vanes 27 and 28 by a roller and slot arrangement or other suitable slidable tension arrangement along the lines of that shown in the abovementioned Smale patent. Such details of the nozzle are not material to my invention.

As indicated above, the vanes 27 and 28 may be moved by suitable actuators rotating the shafts 30 and 31. Any suitable means may be provided to coordinate the movement of such actuators or to connect a single actuator to both shafts so as to operate them in the desired relative amounts so as to schedule the position of the two vanes 27 and 28 with respect to each other as they go through their range of movements from the extreme forward position illustrated in FIG. 6 to the closed position illustrated in FIG. 1.

The details of the cruise nozzle 17 are immaterial to my invention, and any suitable type of variable area nozzle may be employed. However, for the successful practice of the invention, the cruise nozzle must be of a type which will close completely; that is, close so that no flow is permitted except for a reasonable amount of leakage, so that substantially the entire flow is directed through the lift nozzle when the cruise nozzle is closed. One form of cruise nozzle which may be used under these conditions is the type known as the "star" nozzle illustrated schematically in the figures in which the nozzle is defined by a ring of triangular main flaps 49 which rotate about hinge axes perpendicular to the axis of the duct 15. The main flaps 49 come together at the axis of the nozzle to close the nozzle as illustrated in FIG. 5. The margins of the main flaps are connected by a pair of subsidiary flaps 50 between each two adjacent main flaps, the subsidiary flaps being hinged to each other and to the edges of the main flaps. The reason for the name star nozzle will be apparent from FIG. 3 which shows the nozzle open. A nozzle of this type can be made to have relatively small leakage.

The main flaps 49 of a nozzle of the sort illustrated may be actuated concurrently by any suitable linkage such, for example, as those shown in U.S. patents to Gaubatz, No. 2,697,907, Dec. 28, 1954, or to Gardiner, No. 2,828,-602, Apr. 1, 1958.

The same sort of variation between full open and completely closed condition of the nozzles can be achieved with other structures, such, for example, as the sliding bullet type of nozzle disclosed in U.S. Pat. No. 2,383,385 to Heintze, Aug. 21, 1945.

Considering now the operation of the engine, FIG. 1 shows the parts in position for normal forward flight with the cruise nozzle open and the lift nozzle closed. FIGS. 4 and 5 show the cruise nozzle closed as it would be for vertical takeoff.

Ordinarily, of course, there will be more than one such engine in a vertical takeoff type airplane. The lift jets are variable about axes extending transverse to the direction of normal flight both to aid in transition between vertical lift and cruise and also to maneuver the aircraft or control it in yaw during vertical takeoff. FIG. 6 illustrates a position of the vanes 27 and 28 for maximum forward deflection of the lift jet and therefore for maximum rearward thrust. FIG. 7 shows a condition of reduced rearward thrust. From this position, the vanes may traverse further until they are at a point at which the jet is directed vertically downward, at which point there is no fore and aft component of thrust and the lift thrust is a maximum. FIG. 4 illustrates the vanes in a position for an intermediate amount of forward thrust and FIG. 8 illustrates the position of vanes 27 and 28 for maximum forward thrust with the nozzle area still full. At this point vane 28 is in its rearwardmost angle or position.

During this range of operation, it is preferred to maintain the turbine exit conditions constant. The effective nozzle throat area, which is defined between the throat curvature at 34 or 35 of one vane and the face of the other vane or between the two throat curvatures 34 and 35 with compensation for flow variables remains constant. This can easily be achieved by suitable interconnection of the two vanes to a common actuator or suitable control of separate actuators for the two vanes.

In transition from lift to forward flight, as the vane 27 swings further rearwardly from the position of FIG. 8 toward the position of FIG. 9 to throttle the lift nozzle, the jet is deflected still further rearwardly so that the lift component further decreases relative to the forward thrust component. Also, during this range of movement, the cruise nozzle 17 begins to open. The relative motion of the actuator for the cruise nozzle and for the lift nozzle may be accomplished by suitable scheduling means such as a cam arrangement mutually connected to control the actuators for the nozzles 17 and 23 or by a direct control of the lift nozzle with a control of the cruise nozzle responsive to a condition of engine operation such as turbine speed or turbine outlet temperature, or possibly pressure in the exhaust gas duct to vary the cruise nozzle so as to keep this condition constant. Thus, as the vertical lift thrust decreases, the horizontal component of thrust is increased and ultimately in the transition to forward flight the left nozzle is completely closed as illustrated in FIGS. 1 and 2 and the cruise nozzle is fully open. For transition from forward flight to a hovering condition, the cruise nozzle can be closed and the lift nozzle opened to sustain the aircraft as the wing generated lift decreases; also, the lift jet may be deflected forwardly to provide a retarding force on the aircraft.

It has been calculated, with the combination of nozzles illustrated here, that the total thrust exerted by the two nozzles remains substantially constant, with a variation of less than five percent from lift with the cruise nozzle closed to cruise with the lift nozzle closed. On the other hand, an arrangement of fixed area lift and cruise nozzles with a valve which moves so as inversely to open and close ducts to the cruise nozzle and the lift nozzle may cause a loss of as much as forty percent of the total thrust at transition. The reason for this is that the valve is substantially larger than the nozzles and, as the valve begins to open for one nozzle, this flow escapes substantially unthrottled by that nozzle, while the initial closing of the valve to the other nozzle has very little effect on the flow to that nozzle. Thus, in effect, as the valve moves from either of its positions completely closing one nozzle toward an intermediate position, the total flow area behind the engine increases greatly with a resulting loss of thrust due partly to the greater area and also, in ordinary circumstances, to the fact that the resulting increase in the nozzle area tends to cause an overspeed of the engine which is responded to by the engine fuel control to reduce fuel.

Also, the arrangement of the two fully variable nozzles will normally be lighter than the combination of a fixed cruise nozzle and a simple vectoring lift nozzle, both of constant area, plus the large valve necessary to divert the flow from one nozzle to the other.

The nature and advantages of my invention will be clear to those skilled in the art from the foregoing. It will be apparent that modifications may be made without departing from the invention disclosed.

I claim:

1. A jet propulsion and jet lift engine comprising, in combination, a gas generator, a pressurized gas duct leading from the gas generator, a rearwardly directed propulsion nozzle and a downwardly directed lift nozzle both in continuous open communication with the gas duct, means operable to vary the area of the propulsion nozzle through a range from open to closed, and jet control means operable to vector the jet from the lift nozzle and operable to vary the area of the lift nozzle through a range from open to closed, the jet control means including a front vane hinged at the front edge of the lift nozzle, a rear vane hinged at the rear edge of the lift nozzle, means for rotating the vanes concurrently so as to deflect the lift jet through a range from a direction giving a rearward thrust component to a direction giving a forward thrust component while maintaining substantially constant area of the lift nozzle, and means for further rotating the front vane into engagement with the rearwardly-rotated rear vane to throttle and close the lift nozzle so that the total engine thrust may be maintained substantially at full value during transition between lift and propulsion modes of operation, such transition being effected by inverse variation of the areas of the respective nozzles.

References Cited
UNITED STATES PATENTS

| | | | |
|---|---|---|---|
| 3,212,700 | 10/1965 | Guienne et al. | 417—179 |
| 3,333,793 | 8/1967 | Opfer et al. | 244—52 |
| 3,380,661 | 4/1968 | Markowski | 60—229 |

SAMUEL FEINBERG, Primary Examiner

U.S. Cl. X.R.

239—265.29